United States Patent
Glanville

(10) Patent No.: US 12,079,917 B2
(45) Date of Patent: *Sep. 3, 2024

(54) RENDERING OPTIMISATION BY RECOMPILING SHADER INSTRUCTIONS

(71) Applicant: Imagination Technologies Limited, Kings Langley (GB)

(72) Inventor: James Glanville, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,609

(22) Filed: Jun. 23, 2023

(65) Prior Publication Data

US 2023/0351669 A1 Nov. 2, 2023

Related U.S. Application Data

(63) Continuation of application No. 17/665,517, filed on Feb. 5, 2022, now Pat. No. 11,688,123, which is a continuation of application No. 16/888,773, filed on May 31, 2020, now Pat. No. 11,276,222.

(30) Foreign Application Priority Data

May 31, 2019 (GB) ...................................... 1907812

(51) Int. Cl.
| | | |
|---|---|---|
| *G06T 15/00* | (2011.01) | |
| *G06F 8/41* | (2018.01) | |
| *G06F 9/30* | (2018.01) | |
| *G06T 1/60* | (2006.01) | |
| *G06T 15/80* | (2011.01) | |
| *G09G 5/36* | (2006.01) | |

(52) U.S. Cl.
CPC .............. *G06T 15/005* (2013.01); *G06F 8/41* (2013.01); *G06F 9/30101* (2013.01); *G06T 1/60* (2013.01); *G06T 15/80* (2013.01); *G09G 5/363* (2013.01)

(58) Field of Classification Search
None
See application file for complete search history.

(56) References Cited

U.S. PATENT DOCUMENTS

| | | |
|---|---|---|
| 7,292,239 B1 | 11/2007 | Moreton et al. |
| 2010/0013854 A1 | 1/2010 | Michail |
| 2014/0111513 A1 | 4/2014 | Ceylan et al. |
| 2014/0292771 A1 | 10/2014 | Kubisch et al. |
| 2016/0148339 A1 | 5/2016 | Akenine-Moller |
| 2016/0358307 A1 | 12/2016 | Brothers et al. |
| 2016/0379336 A1 | 12/2016 | Tsung et al. |
| 2019/0005713 A1 | 1/2019 | Nevraev et al. |
| 2019/0164337 A1 | 5/2019 | Jin et al. |

*Primary Examiner* — Joni Hsu
(74) *Attorney, Agent, or Firm* — Potomac Law Group, PLLC; Vincent M DeLuca

(57) ABSTRACT

A rendering optimisation identifies a draw call within a current render (which may be the first draw call in the render or a subsequent draw call in the render) and analyses a last shader in the series of shaders used by the draw call to determine whether the last shader samples from the one or more buffers at coordinates matching a current fragment location. If this determination is positive, the method further recompiles the last shader to replace an instruction that reads data from one of the one or more buffers at coordinates matching a current fragment location with an instruction that reads from the one or more buffers at coordinates stored in on-chip registers.

12 Claims, 10 Drawing Sheets

RENDERING OPTIMISATION BY RECOMPILING SHADER INSTRUCTIONS

CROSS-REFERENCE TO RELATED APPLICATIONS AND CLAIM OF PRIORITY

This application is a continuation under 35 U.S.C. 120 of application Ser. No. 17/665,517 filed Feb. 5, 2022, now U.S. Pat. No. 11,688,123, which is a continuation of prior application Ser. No. 16/888,773 filed May 31, 2020, now U.S. Pat. No. 11,276,222, which claims foreign priority under 35 U.S.C. 119 from United Kingdom Application No. 1907812.0 filed May 31, 2019, the contents of which are incorporated by reference herein in their entirety.

BACKGROUND

In computer graphics, the term 'rendering' may be used to describe the process by which images (e.g. for on-screen display) are created from a computer model and in many examples, multiple render operations are involved in creating a single frame of data for display. When rendering a scene (e.g. a 3D scene), the objects in the scene are divided into a large number of smaller pieces, referred to as primitives, which are often triangular in shape. There are several ways in which rendering may be carried out and one example is tile-based rendering. In tile-based rendering, the rendering space (e.g. the screen space) is divided into a plurality of tiles and these tiles may then be rendered independently of each other. Use of tile-based rendering may improve the efficiency of a graphics processing system, particularly if there are a large number of primitives.

In a graphics processing system, a driver at a host processor (such as a CPU) processes an incoming data stream (e.g. from an application) and outputs commands that cause a graphics processing unit (GPU) to perform operations such as render operations. Once the rendering of a frame is completed, the resulting data (e.g. the colour values for each pixel in the rendering space) is written to the framebuffer. Display hardware may then convert the data in the framebuffer into a signal that can be displayed on a display.

The embodiments described below are provided by way of example only and are not limiting of implementations which solve any or all of the disadvantages of known rendering methods and known graphics processing pipelines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A rendering optimisation is described herein. In an example, a method of rendering a scene is described which comprises identifying a draw call within a current render (which may be the first draw call in the render or a subsequent draw call in the render) and analysing a last shader in the series of shaders used by the draw call to determine whether the last shader samples from the one or more buffers at coordinates matching a current fragment location. If this determination is positive, the method further comprises recompiling the last shader to replace an instruction that reads data from one of the one or more buffers at coordinates matching a current fragment location with an instruction that reads from the one or more buffers at coordinates stored in on-chip registers.

A first aspect provides a method of rendering a scene in a graphics system, the method comprising: identifying a first draw call within a current render, wherein the current render samples from one or more buffers; analysing at least a last shader in a series of shaders used by the first draw call to determine whether the last shader samples from the one or more buffers at coordinates matching a current fragment location; and in response to determining that the last shader used by the first draw call does sample from the one or more buffers at coordinates matching a current fragment location, recompiling the last shader to replace an instruction that reads data from one of the one or more buffers at coordinates matching a current fragment location with an instruction that reads from the one or more buffers at coordinates stored in on-chip registers.

A second aspect provides a graphics system comprising a general purpose processor and a graphics processor, wherein the general purpose processor comprises a driver and a compiler, wherein the driver is configured to: identify a first draw call within a current render, wherein the current render samples from one or more buffers; analyse at least a last shader in a series of shaders used by the first draw call to determine whether the last shader samples from the one or more buffers at coordinates matching a current fragment location; and in response to determining that the last shader used by the first draw call does sample from the one or more buffers at coordinates matching a current fragment location, trigger recompilation of the last shader by the compiler to replace an instruction that reads data from one of the one or more buffers at coordinates matching a current fragment location with an instruction that reads from the one or more buffers at coordinates stored in on-chip registers.

Further aspects provide a graphics system configured to perform any of the methods described herein; the graphics system described herein embodied in hardware on an integrated circuit; computer readable code configured to cause any of the methods described herein to be performed when the code is run; a computer readable storage medium having encoded thereon said computer readable code; a method of manufacturing, using an integrated circuit manufacturing system, a graphics system as described herein; an integrated circuit definition dataset that, when processed in an integrated circuit manufacturing system, configures the integrated circuit manufacturing system to manufacture a graphics system as described herein; a computer readable storage medium having stored thereon a computer readable description of an integrated circuit that, when processed in an integrated circuit manufacturing system, causes the integrated circuit manufacturing system to manufacture a graphics system as described herein; an integrated circuit manufacturing system configured to manufacture a graphics system as described herein; and an integrated circuit manufacturing system comprising: a computer readable storage medium having stored thereon a computer readable description of an integrated circuit that describes a graphics system as described herein; a layout processing system configured to process the integrated circuit description so as to generate a circuit layout description of an integrated circuit embodying the graphics system; and an integrated circuit generation system configured to manufacture the graphics system according to the circuit layout description.

The graphics system as described herein may be embodied in hardware on an integrated circuit. There may be provided a method of manufacturing, at an integrated circuit manufacturing system, a graphics system as described herein. There may be provided an integrated circuit definition dataset that, when processed in an integrated circuit manufacturing system, configures the system to manufacture a graphics system as described herein. There may be provided a non-transitory computer readable storage medium having stored thereon a computer readable description of an integrated circuit that, when processed, causes a layout processing system to generate a circuit layout description used in an integrated circuit manufacturing system to manufacture a graphics system as described herein.

There may be provided an integrated circuit manufacturing system comprising: a non-transitory computer readable storage medium having stored thereon a computer readable integrated circuit description that describes the graphics system as described herein; a layout processing system configured to process the integrated circuit description so as to generate a circuit layout description of an integrated circuit embodying the graphics system as described herein; and an integrated circuit generation system configured to manufacture the graphics system as described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1A:
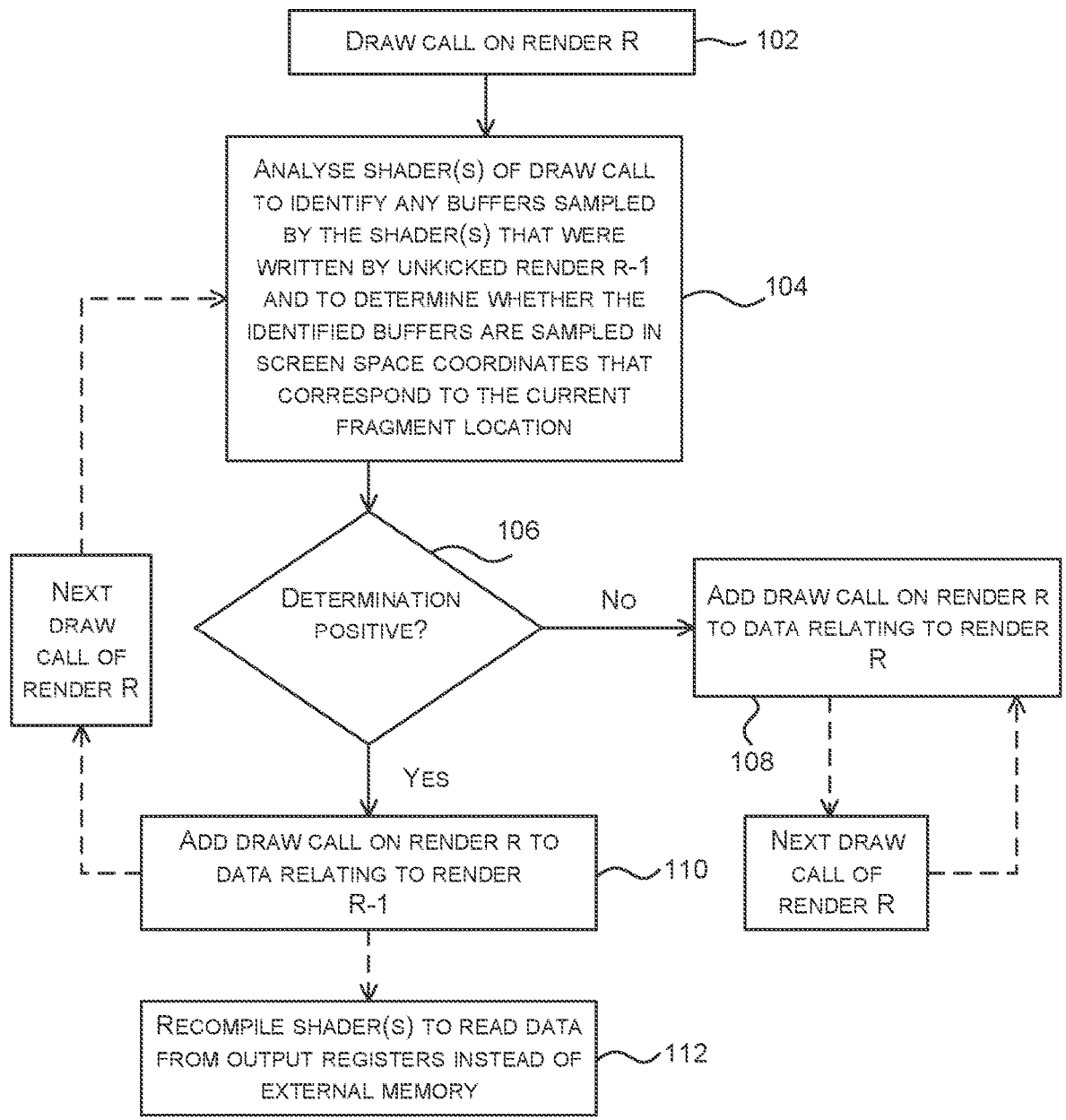
FIG. 1A is a flow diagram showing a first example method of rendering a scene.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, in a graphics processing system, a driver at a host processor (e.g. a CPU) processes an incoming data stream (e.g. from an application) and outputs commands that cause a GPU to perform render operations. The rendering of a single frame, or a single tile of a single frame (e.g. for tile-based rendering) may involve multiple successive render operations and the output data from a render operation is written to external memory (e.g. to a buffer). As well as outputting data (i.e. writing data) to external memory, a render operation will typically read data from one or more other buffers (in external memory) and as a result the render operations may consume a large amount of external memory bandwidth. In many devices, and in particular in mobile/embedded devices, the amount of external memory bandwidth that is available is constrained and this can create a bottleneck that degrades performance. Additionally there is an energy cost associated with reading data from external memory which as a result reduces battery life and generates additional heat which must be dissipated.

The texture sampling hardware of a GPU permits arbitrary sampling from a texture, which may be stored in external memory. Arbitrary sampling permits transformation, e.g. scaling, rotation, or other distortion, of the texture as it is applied to the fragments being shaded. A texture is comprised of texels which often represent image data, e.g. RGB colour data to be applied to fragments, but may also represent other quantities, e.g. surface normals, lighting or shading data, etc., which may also be sampled and applied to fragments.

In some situations, the full arbitrary sampling capabilities of the GPU's texture sampling hardware are not required. For example, a texture may represent quantities in screen space, such that there is a fixed (e.g. 1:1) relationship between the texels in the texture and the sampling (e.g. pixel) locations of the GPU. When such a texture is also generated by the GPU (e.g. where the pixels generated by a previous render become the texels of a texture sampled in a subsequent render), not only may some or all of the texture sampling hardware be bypassed, but there is an opportunity to store the generated pixel data locally, such that the need to write it to and read it from external memory can be avoided.

Described herein are various methods of rendering scenes that exploit this fixed relationship and as a result improve the efficiency of the render operations, e.g. by reducing the external memory bandwidth that is used (e.g. by reducing the number of data reads from external memory) and/or reducing the size of the shader code (e.g. so that the render operations are performed more efficiently in that some of the shader code is removed). The methods described herein may be implemented in a driver running on a CPU and/or in a compiler running on the CPU (which may be considered to be part of the driver or a separate entity running in parallel with, and cooperating with, the driver), and/or in a driver/firmware running on a GPU. The methods are implemented in real-time, e.g. in response to a draw call or as a shader program goes to run on a GPU, although in some examples, there may be some operations which are performed earlier, e.g. when loading an application.

Figure 2:
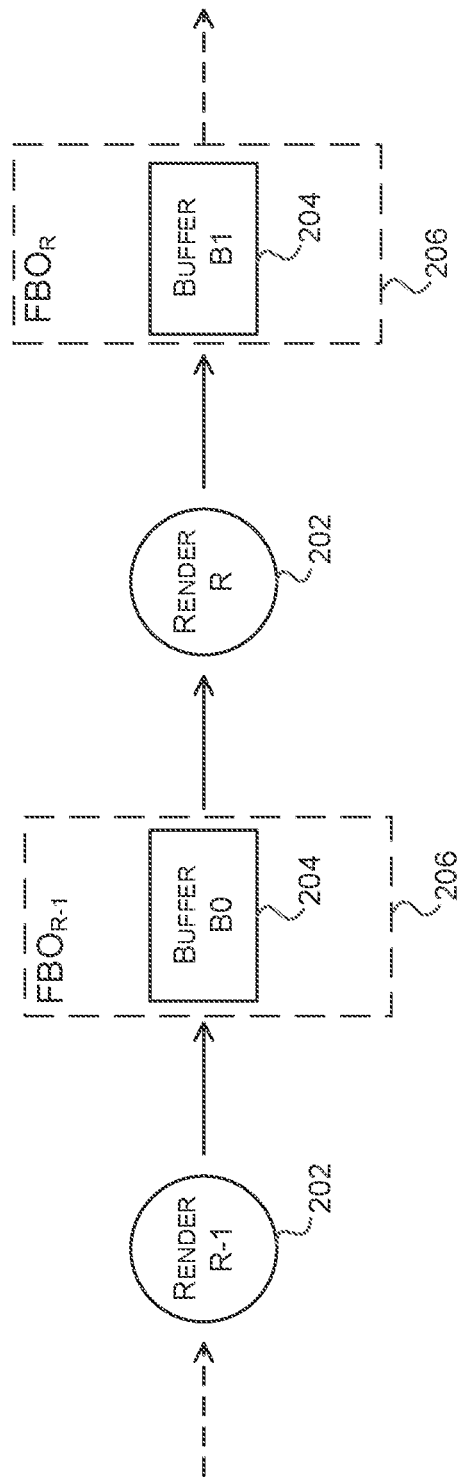
FIG. 2 is a graphical representation of a first example rendering operation comprising a series of renders.

A first example method of rendering a scene may be described with reference to FIGS. 1A and 2. FIG. 1A is a flow diagram showing the example method which can be described with reference to a first example graphical representation shown in FIG. 2. The method of FIG. 1A may be used in situations where the rendering of a frame involves multiple, successive render operations 202 (e.g. two or more render operations), as shown in FIG. 2 (where render operations are represented as circles). A render operation 202 may read data from one or more buffers 204 (represented as rectangles in FIG. 2). Each render operation 202 writes data to one or more buffers 204 which are stored in external memory. Each render writes to an output data structure or object 206 (e.g. a frame buffer object, FBO, represented by dashed rectangles in FIG. 2), which is the container for the one or more buffers 204 to which the render writes. In the example shown in FIG. 2, render R-1 writes to a $FBO_{R-1}$ that comprises a single buffer B0 and render R writes to $FBO_R$ that comprises a single buffer, B1. Any reference to an FBO in the examples described herein is by way of example only and the methods described herein relate to use of any output data structure or object.

As shown in FIG. 1A, in response to a first draw call in render R (block 102, which in many examples is the initial draw call of render R, i.e. such that there are no preceding draw calls in render R, but in other examples the first draw call that is referred to in block 102 may be preceded by other draw calls), one or more of the shaders used by the draw call are analysed (block 104) to identify any buffers that are sampled by the shader(s) that were written by the previous render, render R-1. The analysis then continues in order to enable a determination to be made (in block 106) as to whether the fragment shader (which is one of the shaders used by the draw call) samples the identified buffers in screen space coordinates that correspond to the current fragment location, e.g. whether the fragment shader samples buffer B0 in screen space coordinates that correspond to current fragment position in the example of FIG. 2. It is assumed for the purposes of this explanation of the method that the previous render, render R-1, has not yet been sent for execution on the GPU (i.e. kicked). In the event that the previous render, render R-1, has already been kicked then the identification of buffers (as part of the analysis of block 104) may, in various examples, be performed with reference to an earlier render that has not yet been sent for execution on the GPU (e.g. render R-2). This is described in more detail below.

In the event that the analysis (in block 104) does not identify any buffers that are sampled by the shader(s) that were written by the previous render, render R-1, then in various examples the determination (in block 106) may be considered to be negative and the renders may not be merged. In other examples, however, since the lack of identified buffers does not in itself preclude merging, if the analysis (in block 104) does not identify any buffers that are sampled by the shader(s) that were written by the previous render, render R-1, then in various examples the determination (in block 106) may be considered to be positive.

The analysis to identify buffers and then determine whether the fragment shader samples from the identified buffers written by the previous render in screen space coordinates that correspond to the current fragment location (in block 104) may only be of the fragment shader itself (i.e. analysis of the fragment shader code) or the analysis may additionally involve the corresponding vertex shader (i.e. the vertex shader that generates outputs that are input to the fragment shader). In some examples, data stored in external memory may also be analysed in combination with one or more shaders (e.g. in combination with both a fragment shader and the corresponding vertex shader). This analysis is described in more detail below.

If it is determined that the shader(s) for a first draw call in render R do not sample the identified buffers (i.e. those from which they read and which were written by the previous unkicked render, e.g. B0) in screen space coordinates that correspond to the current fragment location ('No' in block 106), then the draw call is added to data relating to the current render, render R (block 108). The data relating to the current render may be in the form of a sequence of graphics data to be rendered, denoted a "control stream" herein. Any reference to a control stream in the examples described herein is by way of example only and the methods described herein also relate to adding draw calls to data relating to a particular render which may be in the form of a sequence of graphics data to be rendered or of any other form.

If, however, it is determined that the shader(s) for the first draw call in render R do sample the identified buffers (i.e. from which they read and which were written by the previous unkicked render, e.g. B0) in screen space coordinates that correspond to the current fragment location ('Yes' in block 106), then the draw call is added to the data relating to the previous unkicked render, render R-1 (block 110) (e.g. the control stream for the previous render). This has the effect of starting to merge the current render, render R, with the previous unkicked render, render R-1.

If the first draw call was not merged into the previous render (as a consequence of the shader(s) failing the test in block 106), but instead the two renders (render R and render R-1) maintained their separate control streams (as a consequence of the draw call being added to the control stream of render R in block 108), then all subsequent draw calls for that render (i.e. render R) are added to the control stream for that render and no further analysis of shaders is performed. This is because if the draw call samples a buffer written by the previous unkicked render but does not sample the buffer written by the previous unkicked render in screen space coordinates that correspond to the current fragment location, then it is arbitrarily sampling from the buffer (i.e. there is no 1:1 relationship between the texel locations when the data is written and the texel locations when the data is subsequently read). In order for a draw call to be able to arbitrarily sample from a buffer (e.g. from a texture), that buffer needs to be written out to memory. This writing out to memory does not occur until the render that writes to the buffer is executed on the GPU and once this execution is triggered (in a process which may be referred to as 'kicking the render') nothing further can be added to the control stream for the render. Consequently, if the first draw call of render R fails the test for merging the renders (in block 106), then the previous render, render R-1, must be executed on the GPU prior to the execution of the current render, render R.

In contrast, if the first draw call was merged into the previous render (as a consequence of the shader(s) passing the text in block 106), then the analysis described above is repeated for the next draw call in render R. Whilst the shader(s) used by successive draw calls are found to sample the identified buffers (i.e. those from which they read and which were written by the previous unkicked render) in screen space coordinates that correspond to the current fragment location ('Yes' in block 106), the draw calls continue to be added to the control stream of the previous render, render R-1; however, as soon as the shader(s) used by a draw call is found not to sample the identified buffers in screen space coordinates that correspond to the current fragment location ('No' in block 106), that draw call (i.e. the first draw call that fails the test in block 106) and all subsequent draw calls in the current render, render R, are added to the control stream of the current render, render R.

As a consequence of the method shown in FIG. 1A, if the shaders used by each of the draw calls in render R sample the identified buffers in screen space coordinates that correspond to the current fragment location, and hence each of the draw calls in render R pass the test in block 106, the two renders are merged completely, i.e. all the draw calls of render R are added to the control stream of the previous render, render R-1. In other examples, there may be a partial merging, with a first sequence of draw calls from render R, starting with the first draw call from render R, being added to the control stream of the previous render, render R-1, and all subsequent draw calls, starting with the first draw call from render R that fails the test for merging (in block 106), being added to the control stream of the current render, render R.

Whilst FIG. 1A and the above description shows draw calls being added to the control stream of the previous render one at a time in the event that the test (in block 106) is passed, in other examples, all the draw calls of render R may be assessed before a decision is made about which control stream they are added to and then if all the draw calls in render R pass the test ('Yes' in block 105 followed by 'Yes' in block 106), all the draw calls are added to the control stream for the previous render, render R-1 (block 111). However, if any of the draw calls in render R do not pass the test ('Yes' in block 105 followed by 'No' in block 106), all the draw calls are added to a new control stream for the current render, render R (block 109). This variant, shown in FIG. 1B, avoids the partial merging of renders described above.

In a yet further example, in response to a positive determination (in block 106), the draw call is added both to a newly created merged control stream to which all the draw calls from the previous render, render R-1, are also added, and to a control stream for the current render, render R. Subsequent draw calls in the current render, render R, are analysed and if a draw call results in a negative determination (in block 106), then the newly created merged control stream is discarded and the two separate control streams (i.e. one for render R-1 and one for render R) are retained and used when kicking renders and no recompilation of the shader(s) occurs. In contrast, if all the draw calls in the current render, render R, are analysed and result in a positive determination (in block 106), then the individual control streams for the separate renders (i.e. one for render R-1 and one for render R) are discarded and the newly created merged control stream is retained and used when kicking the merged render, and the shader(s) are recompiled as described above.

The test (in block 106) is described above as checking how a shader samples buffers which were written by the previous render, render R-1. If the shader samples buffers that were written by other, earlier renders, that have already been sent for execution on the GPU (a process which may be referred to as 'kicking the render'), then these buffers are not considered in the evaluation (i.e. they do not form part of the set of identified buffers). However, if there are any buffers sampled by the shader that have been written by earlier renders that have not yet been sent for execution on the GPU (i.e. kicked) in addition to, or instead of the immediately previous render, render R-1, then these buffers may also be considered as part of the test, i.e. they may be included in the set of identified buffers and the test (in block 106) therefore checks all buffers sampled by the draw call that are written by renders that have not yet been sent for execution on the GPU to see if the shaders used by the draw call samples those buffers in screen space coordinates that correspond to the current fragment location.

For example, if render R-1 has already been totally merged (e.g. using the method of FIG. 1A) into the immediately previous render, render R-2, such that neither render R-1 nor render R-2 have been sent for execution on the GPU (i.e. neither render R-1 nor render R-2 have been kicked), then the set of identified buffers that are evaluated (in blocks 104-106) to see whether the draw call samples in screen space coordinates that correspond to the current fragment location, includes any buffers written by render R-2 and sampled by the shader(s) used by the draw call as well as those written by render R-1 and sampled by the shader(s) used by the draw call. The analysis (in block 104) and test (in block 106) may therefore be considered to have two parts: firstly identifying any buffers sampled by the shader that were written by one or more earlier renders that have not yet been sent for execution and secondly, determining whether the shader samples from those identified buffers using screen space coordinates that correspond to the current fragment location. In a variation on this, various control streams may be maintained and added to (e.g. one for each individual render and one for each potential combination of merged renders, e.g. one for render R-1 and render R-2, one for render R and render R-1, one for render R and render R-2 and one for a combination of all three renders) and then when a negative determination is made, one or more of these control streams are discarded.

In another example, if the current render, render R samples from buffers written by two previous unkicked renders R-1 and R-2 that have not been merged (e.g. because the determination was negative when the first draw call of render R-1 was assessed), then if render R samples from the buffers written by render R-1 in screen space coordinates and at the current fragment location but and from the buffers written by render R-2 arbitrarily, render R-2 may be kicked and renders R-1 and R merged (i.e. by adding the draw calls for render R to the control stream for render R-1). Similarly, if the current render, render R samples from buffers written by two previous unkicked renders R-1 and R-2 that have not been merged (e.g. because the determination was negative when the first draw call of render R-1 was assessed), then if render R samples from the buffers written by one of the two unkicked renders (e.g. render R-1) in screen space coordinates and at the current fragment location but and from the buffers written by the other of the unkicked renders (e.g. render R-2) arbitrarily, then the render R-2 that wrote the buffers that were sampled arbitrarily (e.g. render R-2) may be kicked and the remaining two renders (e.g. renders R-1 and R) merged (e.g. by adding the draw calls for render R to the control stream for render R-1). This may lead to merging of non-consecutive renders (e.g. the kicking of render R-1 and the merging of renders R and R-2 if instead it was a buffer written by render R-1 that was sampled arbitrarily).

Where render R is at least partially merged with the previous render, render R-1, one or more shaders are recompiled before the merged render is executed on the GPU (block 112). In particular, for each draw call that is merged into the previous render (i.e. by being added to the control stream of the previous render in block 110), at least the fragment shader referenced in the draw call is recompiled to replace texture samples (in screen space coordinates that correspond to the current fragment location) from an identified buffer (e.g. B0) which is stored in external memory, with reads of the corresponding data directly from on-chip registers. Texture samples from any buffers which have already been written to external memory (i.e. because the renders that wrote them have already been sent for execution on the GPU) are not changed as part of the recompilation. In addition, any instructions that are used to calculate the coordinates of the texture samples can be removed as part of the compilation and these instructions may be omitted from the fragment shader and in various examples also from the corresponding vertex shader. As a result, when the render is executed on the GPU, the amount of data read from external memory is reduced (i.e. the memory bandwidth that is used is reduced). This improves the performance and efficiency of rendering a scene, particularly in systems where the memory bandwidth is constrained (e.g. on mobile/embedded devices).

The recompilation (in block 112) may be performed during the draw call. To reduce the overall number of recompilations that are performed, the recompilation may be performed once per shader, e.g. when render R is used to render a first frame. For a subsequent frame, if rendered following the same pattern, no further recompilation is performed and instead a previously recompiled variant of the shader is identified and selected (e.g. in a replacement to block 112).

To assist with the recompilation (in block 112), a mapping table may be generated that maps texture sample coordinates to the corresponding on-chip registers where the data is stored. Entries may be added to this table as part of the analysis operation (in blocks 104-106) and then subsequently used (in block 112). In other examples, different techniques may be used to pass the mapping information (i.e. mappings between texture sample coordinates and registers) between the driver that performs the analysis (in block 104) and the compiler that performs the on-the-fly recompilation of the shaders (in block 110). In some examples, where the same shader is referenced in multiple draw calls with different inputs, the recompilation (in block 112) may generate multiple variants of the same shader with the different recompiled variants being used for different renders.

In the description above, only the shaders from the current render, render R, are recompiled (where necessary) to read data from on-chip registers instead of external memory. This is because the data written by the previous render, render R-1, is automatically written to the on-chip registers before it is then written to external memory (e.g. once the render is kicked). In an implementation where renders do not write data first to on-chip registers, the shaders in the previous render that write the data sampled by the current render in screen space coordinates that correspond to the current fragment location, are also recompiled so that the data is written to on-chip registers as well as, or instead of, to external memory.

Whilst, as a consequence of the recompilation, the merged draw calls of current render, render R, now read from the on-chip registers instead of the external memory, the data may still be written by the merged render to the buffers in external memory (e.g. to buffer B0). This is because the data in the buffer may be used by a subsequent render (e.g. render R+X) and once a render is kicked, the data written by that render may no longer be held in the on-chip registers or where the data is still in the on-chip registers, it may be inaccessible and/or unreliable (e.g. because the data may be overwritten by subsequent operations).

The analysis of the shader(s) (in blocks 104-106) may, for example, comprise analysing the fragment shader used by the draw call (and optionally the corresponding vertex shader) to identify whether one of a set of predefined patterns is present in the shader(s). These patterns may be specified such that if one is found, then this indicates that the shader samples in screen space coordinates that correspond to the current fragment location and hence the test for merging (in block 106) is passed.

One or more example predefined patterns may correspond to the transformation of a variable, performed in a fragment shader, from homogeneous clip space coordinates to screen space coordinates, where the variable in homogeneous clip space is received from a corresponding vertex shader, and where the resulting variable in screen space is then used to sample from a texture at a location that corresponds to the fragment location. For example a fragment shader program may contain code such as:

$$\text{Coord} = (\text{texCoord} \times A) + B$$

$$\text{Col} = \text{texture}(t, \text{Coord})$$

Where texCoord is the variable received from the vertex shader and is known to be in clip space coordinates, A and B are constants, and the second statement samples the texture 't' at coordinate 'Coord' to determine the colour of a pixel. The values of constants A and B may, for example, be A=B=0.5, to map the typical clip space coordinate range of −1.0 to 1.0 into a screen space range of 0.0 to 1.0. When the view port is also full screen, the use of these coordinates to sample a texture indicates that the texture is being sampled in screen space at a location that corresponds to the current fragment location. This particular transformation is tightly coupled with the view port size. Other patterns may be defined which do not require a specific view port size.

In various examples, analysis of the fragment shader alone may not be sufficient to determine whether the fragment shader samples from the identified buffers in screen space coordinates that correspond to the current fragment location, e.g. because it is not clear from the fragment shader whether the variable that is input from the vertex shader is a coordinate in clip space coordinates (e.g. which is a requirement in the pattern detailed above). In such examples, a predefined pattern may also impose conditions on the vertex shader and the vertex shader may be analysed together with the fragment shader.

In further examples, analysis of both the corresponding fragment and vertex shaders may not be sufficient to determine whether the fragment shader samples from the identified buffers in screen space coordinates that correspond to the current fragment location, e.g. because the u,v coordinates of a sample are not calculated within the vertex shader but are instead read from external memory. In such examples, a predefined pattern may also impose conditions on the data stored in external memory (e.g. in geometry buffers) and this data may be analysed together with the vertex and fragment shaders. For example, if the vertex shader simply passes through values read from the vertex buffers, and the fragment shader uses those values to sample a texture, for example as below:

```
Vertex shader:
   in vec4 in_pos;
   in vec4 in_coord;
   out vec4 out_coord;
   void main ( ) {
      gl_Position = in_pos;
      out_coord = in_coord;
   }
Fragment shader:
   in vec4 out_coord;
   out vec4 colour;
   void main ( ) {
      colour = texture(t,out_coord);
   }
``` then if it is known (or determined) that the values from the vertex buffer corresponding to in_pos define a full screen quad in homogeneous clip space coordinates, and further that it is known (or determined) that the vertex buffer corresponding to in_coord defines an exact 0-1 mapping across the quad, and it is known (or determined) that the texture t is the same size as the output resolution, then it can be concluded that the sampling is in screen space coordinates that correspond to the current fragment location. These criteria placed on the vertex buffer can be analysed using another form of pattern matching in which values that are known to correspond to a full screen quad are sought.

In a more complex example, the shaders may not simply pass through the values but may instead modify them before passing them through and using them. For example, a model-view-projection (mvp) matrix may be used to modify the position from the vertex buffer, e.g.:

```
Vertex shader:
   uniform mat4 mvp;
   in vec4 in_pos;
   in vec4 in_coord;
   out vec4 out_coord;
   void main ( ) {
      gl_Position = in_pos * mvp;
      out_coord = in_coord;
   }
Fragment shader:
   in vec4 out_coord;
   out vec4 colour;
   void main ( ) {
      colour = texture(t,out_coord);
   }
```

In this case, in addition to the analysis performed in the previous example, the values provided by the application for the MVP matrix are additionally considered. This may be done either by looking for common patterns in the matrix (i.e. looking for an identity matrix, which by its nature would not modify the value of in_pos when the two are multiplied), or by emulating the transformation described in the vertex shader (in_pos*mvp) in the driver and analysing the resulting values to see if they correspond to a full screen quad.

In various examples, the fragment shader has a standard variable that corresponds to the current screen position, and this variable may be denoted 'fragCoord' (or 'gl_FragCoord' in GLSL™). In such examples, two further example predefined patterns may look for a texture sample from this coordinate. For example a first pattern may identify code such as:

Col=texelFetch(t,fragCoord)

Where texelFetch samples a texture, t, using non-normalised integral coordinates. Alternatively, a second pattern may identify code that performs a texture sample from a normalised version of this coordinate:

Col=texture(t,fragCoord/R)

Where R is a constant that is dependent upon the resolution of the display (e.g. screen) to which the scene is being rendered. These patterns are, unlike the first pattern described above, view port agnostic.

In all the example patterns described above, either the pattern that is being identified corresponds to a screen-space transformation, i.e. a transformation from coordinates in a first (non-screen-space) coordinate system (e.g. clip space coordinates) to screen space coordinates, or the pattern identifies coordinates as being already in screen space.

In various examples, to assist with the analysis (in block 104), flags (which may be referred to herein as 'semantic flags') may be attached to variables in the vertex and/or fragment shader when they are compiled to register properties of those variables. For example, a flag attached to an input variable may indicate what the variable actually means (e.g. that it is the homogeneous clip space coordinates of the current fragment) or it may indicate that if the input variable is data of a particular, defined, form, then the output of a transformation will be a screen-space coordinate (e.g. a sample position in screen space coordinates that corresponds to the current fragment location).

Figure 3:
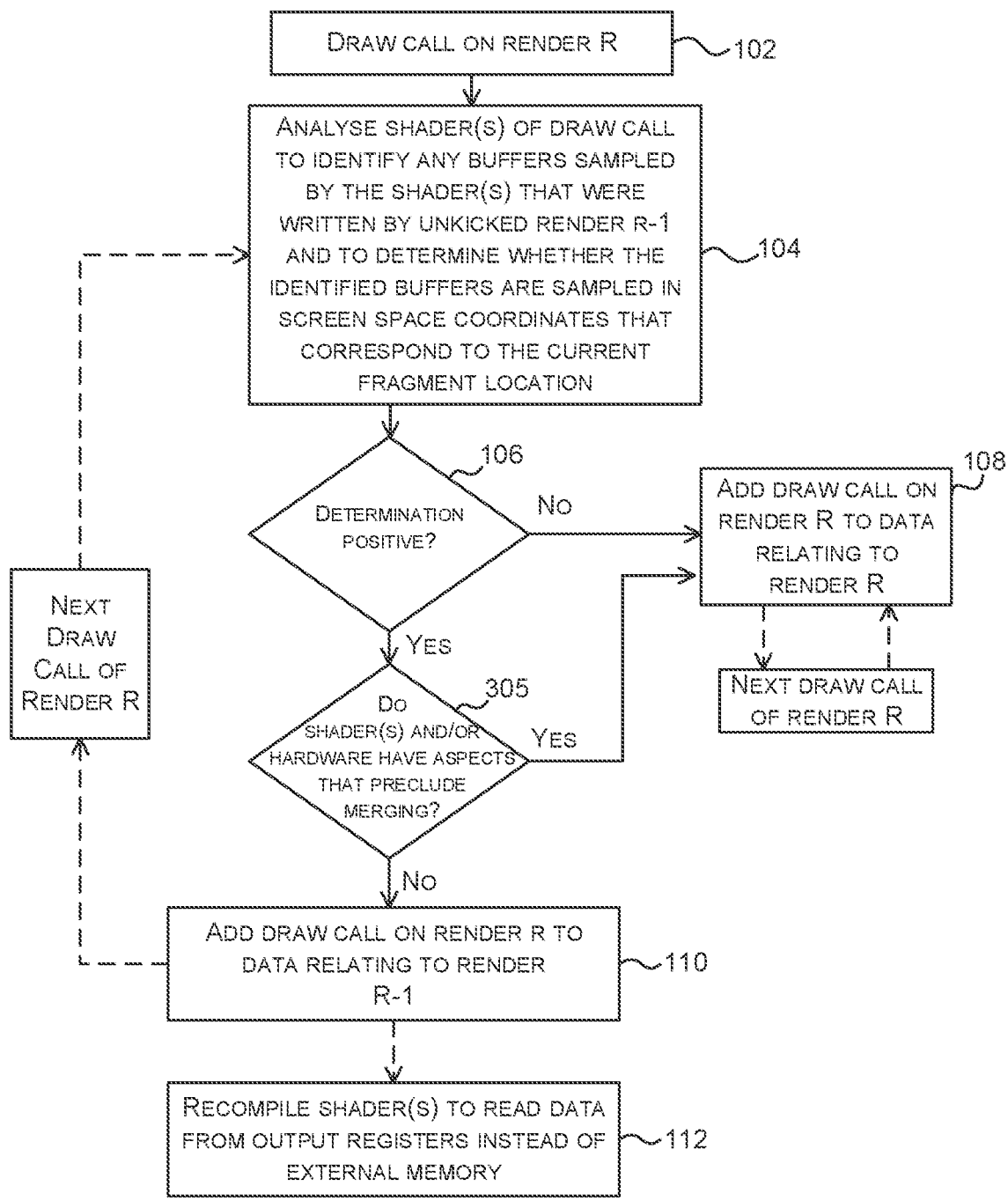
FIG. 3 is a flow diagram showing a third example method of rendering a scene which is a variant of that shown in FIG. 1A.

In various examples, in addition to performing the analysis of the shader(s) (in block 104) one or more additional checks may be performed (block 305), as shown in FIG. 3. FIG. 3 is a flow diagram of a second example method of rendering a scene and is a variant of that shown in FIG. 1A and described above (although in other examples, it may be implemented as a variant of the method of FIG. 1B). This additional test (in block 305) blocks the merging of the current render, render R, with the previous render, render R-1, in the event that the additional test is failed and the additional test may be arranged to identify and prevent merging in scenarios that would cause the merging of renders to fail. The test (in block 305) may involve checks done on the shader and/or the hardware used to execute the shader (e.g. in the GPU). In an example, this test may determine whether there are sufficient on-chip registers to store the additional outputs without spilling off-chip and then prevent merging if it is determined that there are insufficient on-chip registers. This may involve checking both the shader(s), e.g. to determine the combined number of outputs, and the hardware, e.g. to determine the number of on-chip registers available.

Figure 1B:
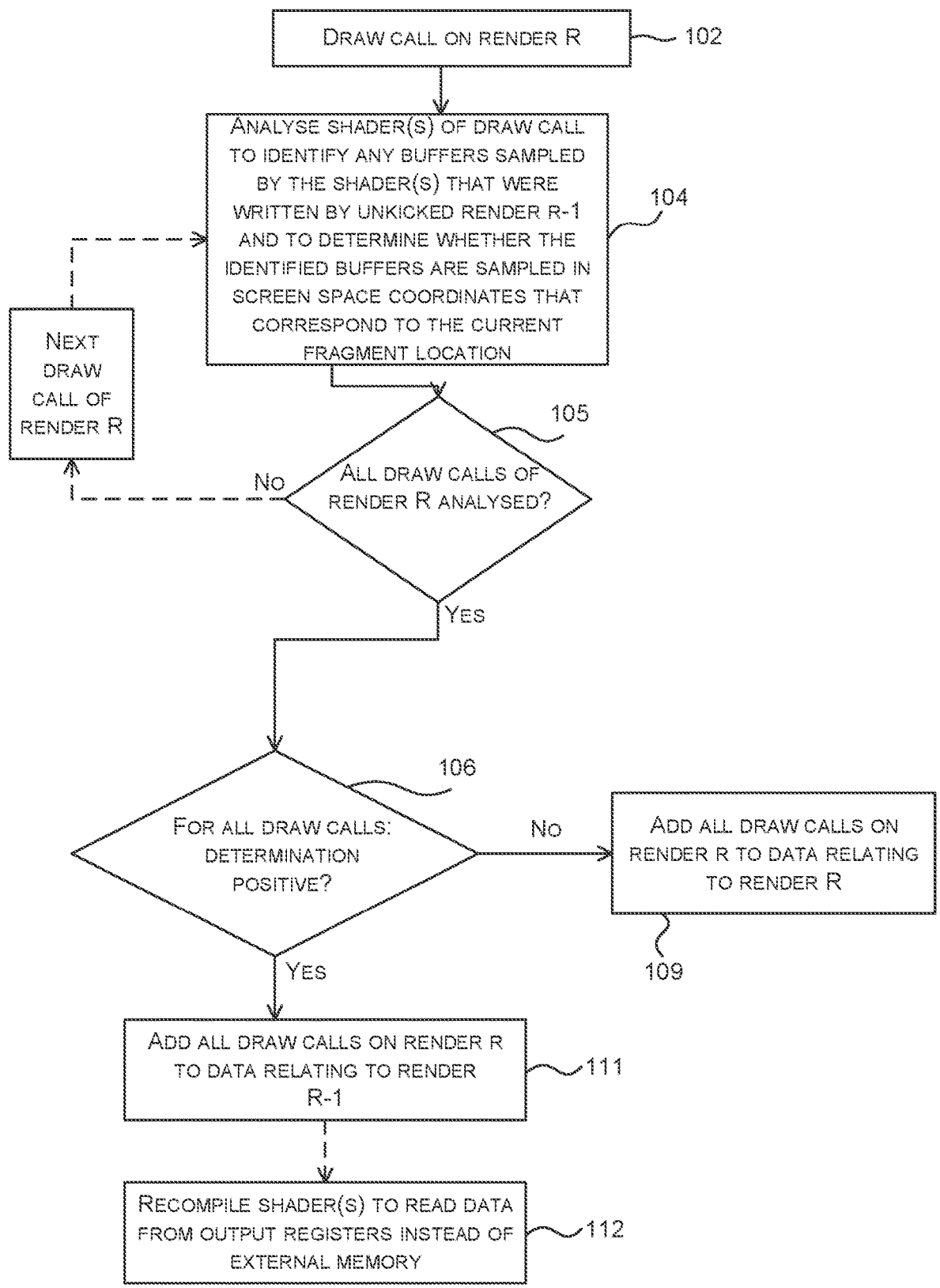
FIG. 1B is a flow diagram showing a second example method of rendering a scene which is a variant of that shown in FIG. 1A.
Figure 4:
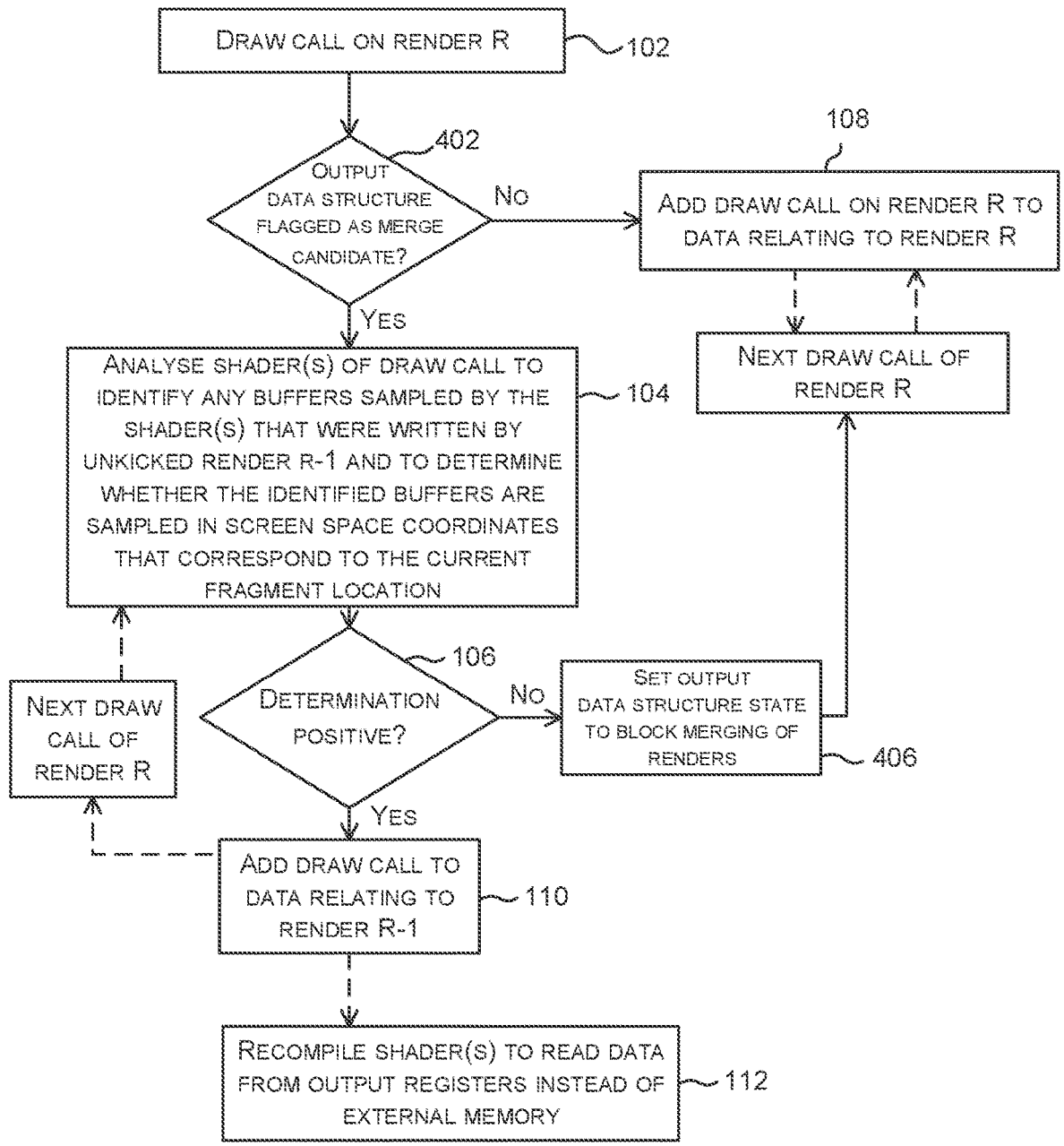
FIG. 4 is a flow diagram showing a fourth example method of rendering a scene which is a variant of that shown in FIG. 1A.

To reduce the amount of analysis of shaders that is performed (in block 104) and thereby improve the efficiency of the rendering process, each output data structure or object 206 written by a render (referred to herein as an FBO) may have an associated parameter (or state or flag, etc.) that triggers a 'fast fail' of the merge tests (e.g. in block 106 of FIGS. 1A and 1B and in blocks 106 and 305 in FIG. 3). This 'fast fail' results in the analysis (in block 104) not being performed for the particular render. FIG. 4 is a flow diagram of a third example method of rendering a scene, which includes the fast fail stage, and is a variant of that shown in FIG. 1A and described above. Whilst this is shown without the additional test of FIG. 3 (block 305), it will be appreciated that in a further example, the additional test of FIG. 3 may also be included in the method of FIG. 4. In other examples, the fast fail test of FIG. 4 may be included in the method of FIG. 1B.

As shown in FIG. 4, in response the first draw call on render R (block 102) and before performing the analysis of one or more shaders referenced in the draw call (in block 104), the fast fail parameter, which may be referred to as a 'merge candidate' parameter/flag/state, for the output data structure or object 206 (e.g. FBO) to which the render writes (e.g. for the output data structure or object to which the render binds), is checked (block 402). In various examples, this merge candidate parameter may have two possible states: positive and negative. The positive state indicates that the render may be a merge candidate because either there have been no previous renders using this output data structure or object or any previous renders have been merged ('Yes' in block 402) and the analysis of the shader is performed (in block 104). The negative state indicates that the render is not to be merged ('No' in block 402, e.g. the output data structure or object is black-listed in relation to this render merging technique) and so the draw call is added to the control stream of render R (in block 108).

The method of FIG. 4 also shows how the merge candidate parameter may be updated in the event that the analysis is performed. If, as a consequence of the analysis (in block 104), it is determined that the shader(s) do not sample the identified buffers in screen space coordinates that correspond to the current fragment location ('No' in block 106), then the merge candidate parameter for the output data structure or object is changed from its current state of positive to negative (block 406). This prevents the analysis being performed repeatedly for the same output data structure or object in successive frames that are being rendered and improves the efficiency of the rendering process.

In addition to, or instead of, using the merge candidate parameter to provide a fast fail and reduce the amount of analysis that is performed (in block 104), in various examples, this state may be used to trigger one or more optimizations. In various examples, these optimizations may be performed during the processing of the previous render, render R-1, based on the value of the merge candidate parameter for the output data structure or object of the next render, render R. For example, in the event that the merge parameter state is positive, the fragment shader of the previous render (render R-1) may additionally be recompiled (e.g. in block 112 for render R-1) such that the data output for storage in the on-chip buffers is in a particular format (e.g. a format of reduced size, such as U8). In the event that the two renders (render R-1 and render R) are not merged, despite the merge candidate parameter indicating that this was not blocked, application of some of the optimizations (e.g. outputting the data in a format of reduced size) may impact performance (e.g. by reducing precision and hence visual quality). In such examples, a third merge parameter state of unknown may be used to indicate that there have been no previous renders using this output data structure or object. In the method of FIG. 4 (in block 402), the 'positive' and 'unknown' states may be treated in the same way (i.e. 'Yes' in block 402), but any optimizations may only be applied where the merge candidate parameter is positive. Where an 'unknown' state is used there may be an additional parameter update operation (not shown in FIG. 4) in which, upon successful merging of render R into render R-1 (i.e. after all draw calls have been added to the data relating to render R-1), the merge candidate parameter is updated from unknown to positive.

In FIGS. 1A, 1B, 3 and 4 and the description above, the current render, render R, is described as being potentially merged with the previous render, render R-1. The methods may then be repeated for subsequent renders, i.e. to determine whether to merge the new current render with the previous render. For example, initially the methods of FIGS. 1, 3 and 4 may be implemented for R=2 and then may be implemented for each successive render (e.g. R=3, R=4 . . . ). As noted above, when performing the analysis of shaders (in block 102) and the test for screen space coordinates that correspond to the current fragment location (in block 104), this is performed in relation to those buffers that are read by the current render and that were written by a render that has not yet been kicked. Any buffers that are read by the current render that were written by a previous render that has already been kicked (and hence the data has already been written to external memory and is not available in the on-chip registers) are excluded from the analysis.

Whilst the examples described above only refer to the merging of two renders, render R-1 and render R, in various examples more than two renders may be combined. For example, if a second render (e.g. render R) is merged entirely into a first render (e.g. render R-1), as a consequence of all the draw calls of the second render being added to the control stream of the first (and hence previous) render to produce a single merged control stream (for both the first and second renders), when the first draw call is received on the next render, i.e. the third render (which is now render R), the methods of FIG. 1, 3 or 4 may be used to determine whether to add draw calls of this third render to the single merged control stream of the first and second renders (in block 110). The merging of renders may be subject to a limit in terms of the number of on-chip registers are available on-chip and once reached, no further merging is possible (e.g. as prevented by the test in block 305 of FIG. 3).

Figure 5:
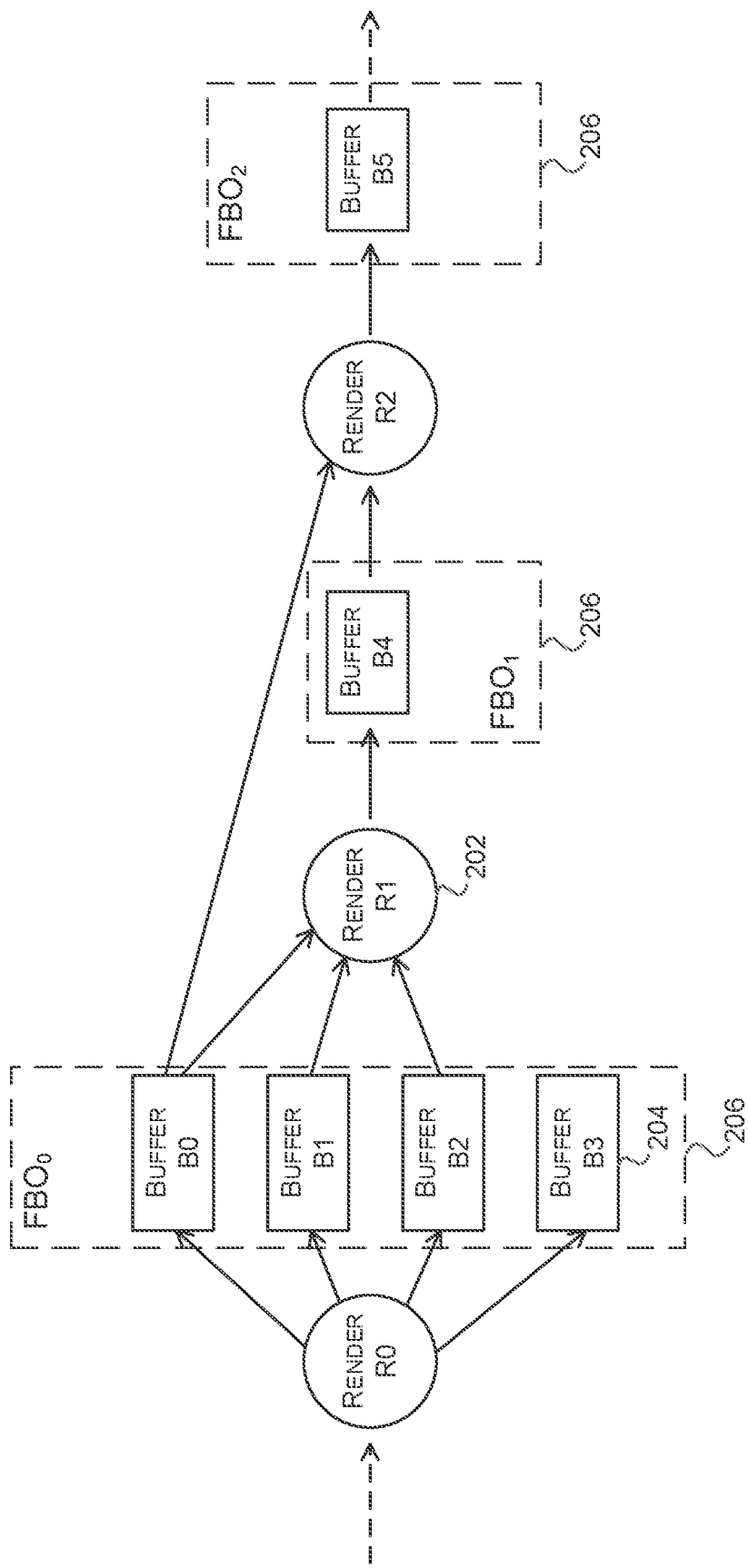
FIG. 5 is a graphical representation of a second example rendering operation comprising a series of renders.

In the example of FIG. 2, each output data structure or object 206 (e.g. each FBO) comprises only a single buffer and each render only reads data from a single buffer. In other examples, a render may read data from more than one buffer and/or may write data to more than one buffer (e.g. the output data structure or object to which a render binds may comprise more than one buffer) and the methods described above (e.g. as shown in FIGS. 1A, 1B, 3 and 4) may also be applied in these examples. In the example of FIG. 5, the output data structure or object 206 for render R0 comprises four buffers (B0-B3) and the next render, render R1, reads from three buffers (B0-B2). Furthermore, as also shown in FIG. 5, a render may read from buffers that were not rendered by the immediately previous render but by another earlier render, e.g. render R2 reads from buffer B4 which was written by render R1 and buffer B0 which was written by render R0, and again the methods described above (e.g. as shown in FIGS. 1, 3 and 4) may also be applied in these examples. In such an example, by merging renders R1 and R2, the read of buffer B4 from external memory is avoided and although buffer B0, which was written by render R0, will not be in the on-chip registers (unless renders R0, R1 and R2 are all merged), since the reading of B0 in R1 and R2 will be closer together, the contents of buffer B0 are more likely to be present in a cache within the cache hierarchy and hence the caching will be more efficient. This is particularly true for tile-based rendering as there will be fewer intervening samples between the sampling of B0 by R1 and the sampling of B0 by R2.

In the methods described above, the analysis (in block 104) uses pattern matching to determine whether the fragment shader used by a draw call samples from the identified buffers in screen space coordinates that correspond to the current fragment location. Where the buffers are sampled in screen space coordinates that correspond to the current fragment location, there is a 1:1 pixel map between the sampled buffer (e.g. B0 in FIG. 2) and the output buffer (e.g.

1). The test (in block 106) can therefore be described in different ways that are all equivalent:

Do the shader(s) sample identified buffer(s) in screen space coordinates that correspond to the current fragment location?

Is there a 1:1 pixel map between the sampled identified buffer(s) and the output buffer(s)?

Does the data in the sampled identified buffer(s) represent pixels (rather than texels)?

The example patterns described above provide some ways in which the result of this test can be determined through analysis of the shader code (and in various examples, also data stored in external memory); however, in further examples, other patterns or other analysis techniques may be used.

In various examples, the methods described above (and shown in FIGS. 1A, 1B, 3 and 4) may be implemented in a graphics processing system that uses tile-based rendering. In such examples, the rendering is performed on a per-tile basis, such that a render is performed for all of the tiles before progressing to the next render (e.g. where renders R0 and R1 are not merged in any way, R0 is performed for all tiles in turn, followed by R1 for all tiles). It is this ordering of the processing that leads to the cache efficiencies described above. Where tile-based rendering is used, the amount of data written by a render is reduced compared to the same render being performed on the entire screen space and this may facilitate merging (e.g. because of the need to be able to store data in the on-chip registers, as described above). The methods described above may also be used for non-tile-based rendering systems (e.g. where the amount of data that is written is of a size that can be stored in the on-chip registers).

By using the method of FIG. 1A, 1B, 3 or 4, or any combination thereof, two or more renders may be automatically merged (i.e. merged without any user input or requiring any special action on the part of those writing applications) if certain conditions are identified by analysing the shaders and additionally parameters associated with the output data structure or object which is bound by the render. The merging of a current render, render R, and a previous unkicked render, e.g. render R-1, has the effect of deferring the previous render (e.g. render R-1) because it cannot be executed on the GPU whilst additional draw calls (from render R) are still being added to its control stream. As described above, whilst the description refers to the merging of render R and render R-1, if the immediately previous render, render R-1, has already been kicked, the current render may, in various examples, be analysed and potentially merged with another, earlier and unkicked, render.

Figure 6:
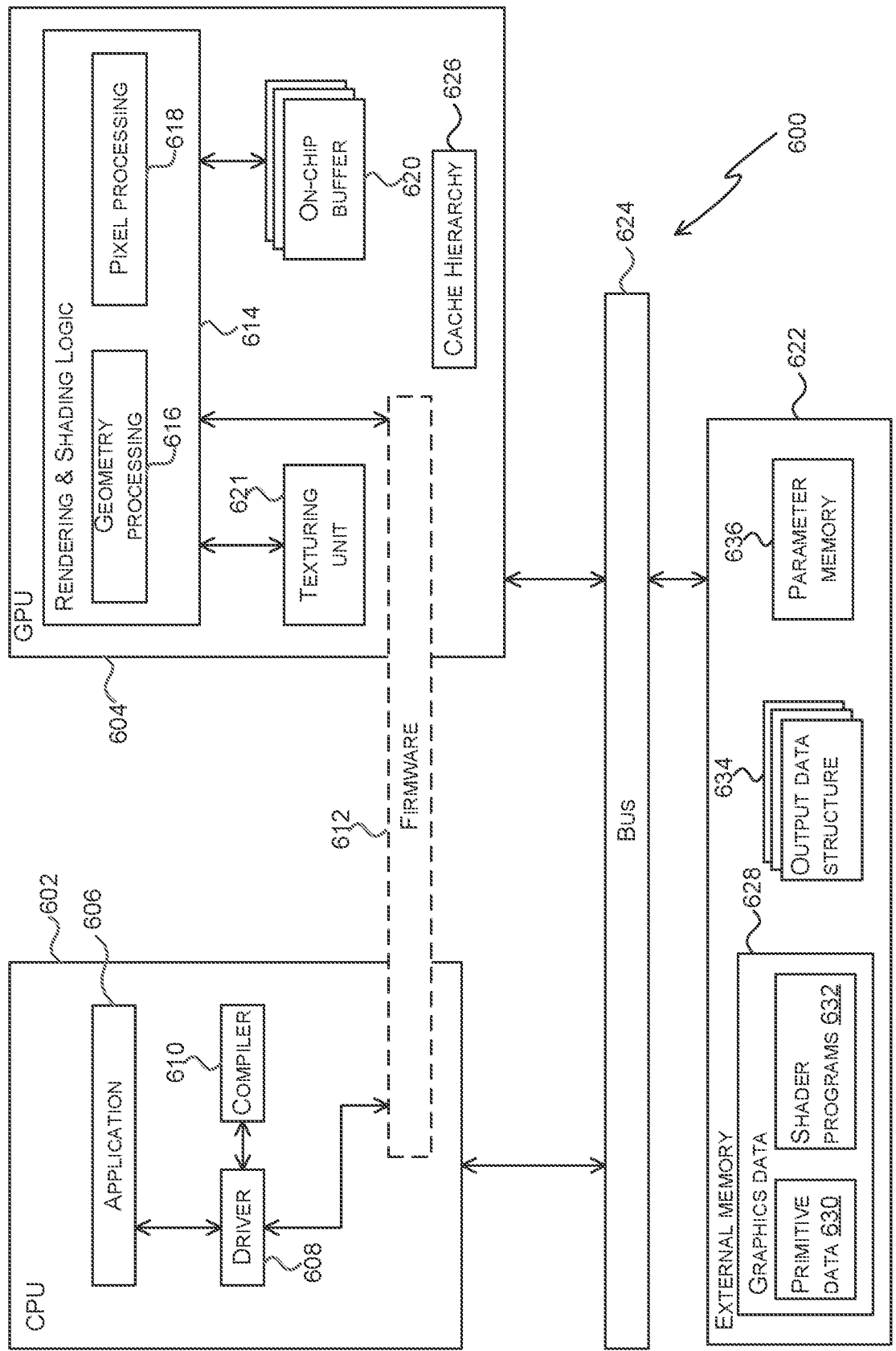
FIG. 6 is a schematic diagram of a graphics system that may implement any of the methods described herein.

The methods described above (e.g. as shown in FIGS. 1A, 1B, 3 and 4) may be implemented in a graphics system such as shown in FIG. 6. The system 600 may be implemented on a device such as a smart phone, tablet, laptop, personal computer, games console, television or another device on which graphics data is to be processed. As shown in FIG. 6, the system comprises a general purpose processor (CPU) 602 and a graphics processor (GPU) 604. Both the general purpose processor 602 and the graphics processor 604 may be implemented in hardware or software or a combination thereof. Whilst the graphics processor 604 is shown as a GPU in FIG. 6, in other examples it may be implemented as a computer program running on a programmable device such as a CPU. Similarly, the general purpose processor 602, whilst shown as a CPU in FIG. 6, may be implemented as a computer program running on a programmable device such as a CPU. It will be appreciated that for the sake of clarity not all the functional blocks within the general purpose processor 602 or the graphics processor 604 are shown in FIG. 6.

The general purpose processor 602 comprises an application 606, for example at an application layer in the processor. The application 606 is configured to communicate with a driver 608 at a driver layer, for example by way of an API. The driver 608 may comprise a compiler 610 or alternatively, the compiler 610 may be a separate module that runs in parallel and close communication with the driver 608. The driver 608 is configured to communicate with the hardware or firmware layer and in FIG. 6 is shown, by way of example, to communicate with the firmware 612. Each of the application 606, driver 608 and compiler 610 may be implemented as a software unit or module running on the general purpose processor 602, e.g. the application 606 may comprise a module running in accordance with application software, the driver 608 may comprise a module running in accordance with driver software and the compiler 610 may comprise a module running in accordance with compiler software.

The graphics processor 604 comprises rendering and shading logic 614 and the rendering and shading logic 614 comprises geometry processing logic 616 and pixel processing logic 618. The geometry processing logic 616 is configured to execute geometry processing operations and the pixel processing logic 618 is configured to execute pixel processing operations. The graphics processor comprises a plurality of on-chip buffers 620 and the geometry processing logic 616 and pixel processing logic 618 are configured to communicate with the on-chip buffers 620, which may alternatively be referred to as local memory. The graphics processor 604 further comprises a texturing unit 621 that is configured to process the samples in the shaders and is therefore responsible for requesting data to be fetched from external memory 622. Where the methods described above result in data being accessed from the on-chip buffers 620 (which contain the on-chip registers referred to above) instead of external memory 622, the processing of the samples by the texturing unit 621 is avoided.

The general purpose processor 602 and the graphics processor 604 are configured to communicate with the external memory 622 via a bus 624. In various examples, the graphics system further comprises a cache hierarchy 626, which comprises a series of caches arranged to cache data from the external memory 622 that is accessed by the graphics processor 604. Whilst this is shown in FIG. 6 as being implemented in the GPU, in other examples this may be implemented entirely off-chip (i.e. accessible by the general purpose processor 602 and the graphics processor 604 via the bus 624), or in some further examples, one or more of the highest levels of the cache hierarchy 626 may be implemented in the GPU and other levels outside the GPU. The external memory 622 is configured for storing graphics data 628, such as primitive data 630 (e.g. the original data provided by the application 606 describing the graphics) and shader programs 632. The external memory 622 is also configured to store a plurality of FBOs 634 (or other output data structures or objects 206) and a part of the external memory may be denoted the parameter memory 636. The parameter memory 636 may be configured to store data generated by the geometry processing logic 616 (e.g. the result of initial geometry processing) that is then used by the pixel processing logic 618.

The methods described above (e.g. as shown in FIGS. 1A, 1B, 3 and 4) may be implemented predominantly within the driver 608 in FIG. 6. For example, the driver 608 is configured to perform the analysis of the shader(s) referred to in a draw call of a render (in block 104), to make determinations based on this analysis (in blocks 106 and 305) and to generate control streams (in blocks 108 and 110). Where a merge parameter for a output data structure or object is used (as in the method of FIG. 4), the driver 608 is further configured to determine whether to perform the analysis dependent upon the state of the merge parameter (in block 402) and to update the merge parameter state in response to analysis of the shader(s) (in block 406). The merge parameters may be stored in the external memory 622. The compiler 610 is configured to perform the recompilation of the shader(s) (in block 112) and in various examples, multiple variants of a shader may be generated be recompilation by the compiler 610, e.g. based on mapping data generated by the driver 608. The mapping data and shader variants may be stored in the external memory 622.

The control steams that are generated by the driver 608 comprise the commands and set-up information needed to configure the graphics processor 604 for the desired operations to be executed. Once a control stream has been generated, the initiation of the render (or partial render, where draw calls are split across two control streams, as described above) on the graphics processor 604 can be triggered and as noted above this may be referred to as 'kicking the render'. The triggering may occur as soon as the control stream for a render is completed or the triggering may be delayed, e.g. until the particular render needs to be drawn to a display or until the data output by that render is needs to be sampled arbitrarily by another render.

As described above, the merging of renders using any of the methods described above (or combinations of those methods), reduces the external memory bandwidth and this in turn improves efficiency, reduces power consumption and heat generation. Additionally, there is an overhead (in terms of time taken) associated with triggering (e.g. kicking) a render and by reducing the number of renders through merging, this overhead is reduced (i.e. less time is spent setting up renders and the overall performance of the system is therefore improved).

A further example method of rendering a scene may be described with reference to FIGS. 7 and 8. This method may be used independently of the methods described above (as shown in FIG. 7) or in combination with any of the methods described above (e.g. as shown in FIG. 8). Unlike the methods described above, the method of FIG. 7 may, for example, be used in situations where the rendering of a frame does not involve multiple, successive render operations and/or where there is insufficient space in on-chip output buffers to store the data that is being written by a render.

Figure 7:
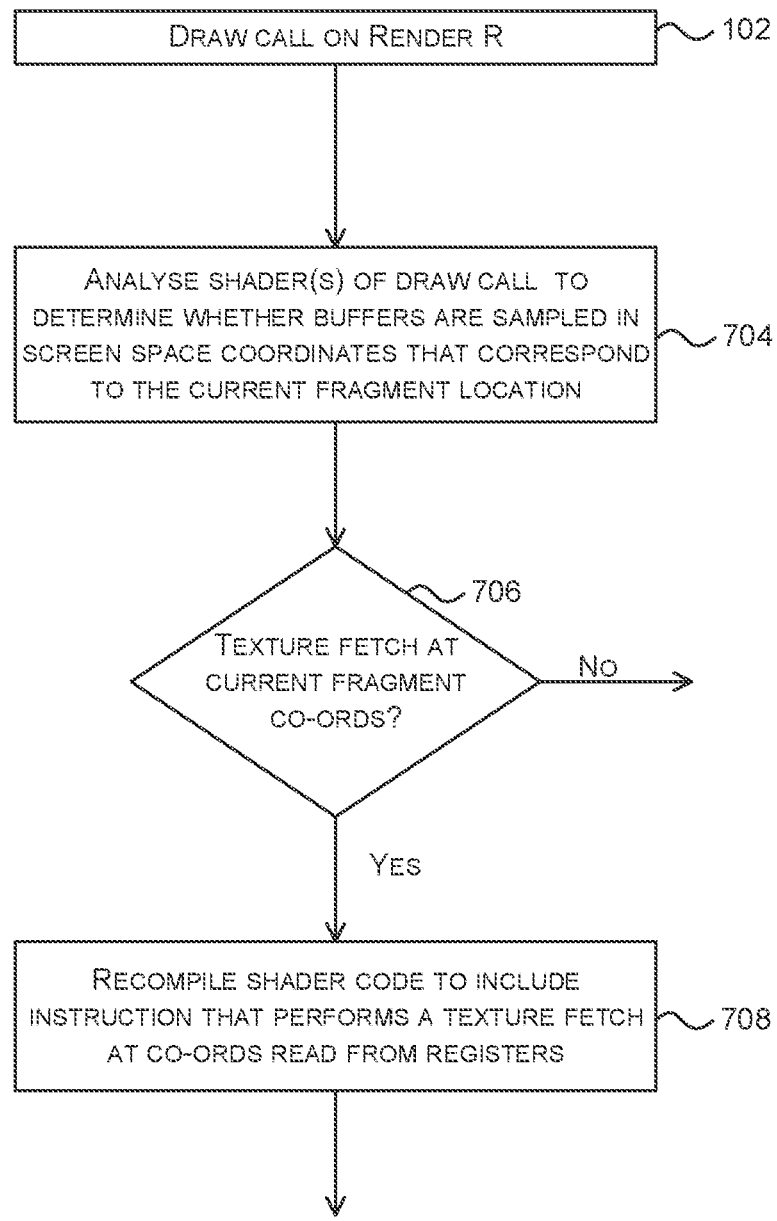
FIG. 7 is a flow diagram showing a fifth example method of rendering a scene.
Figure 8:
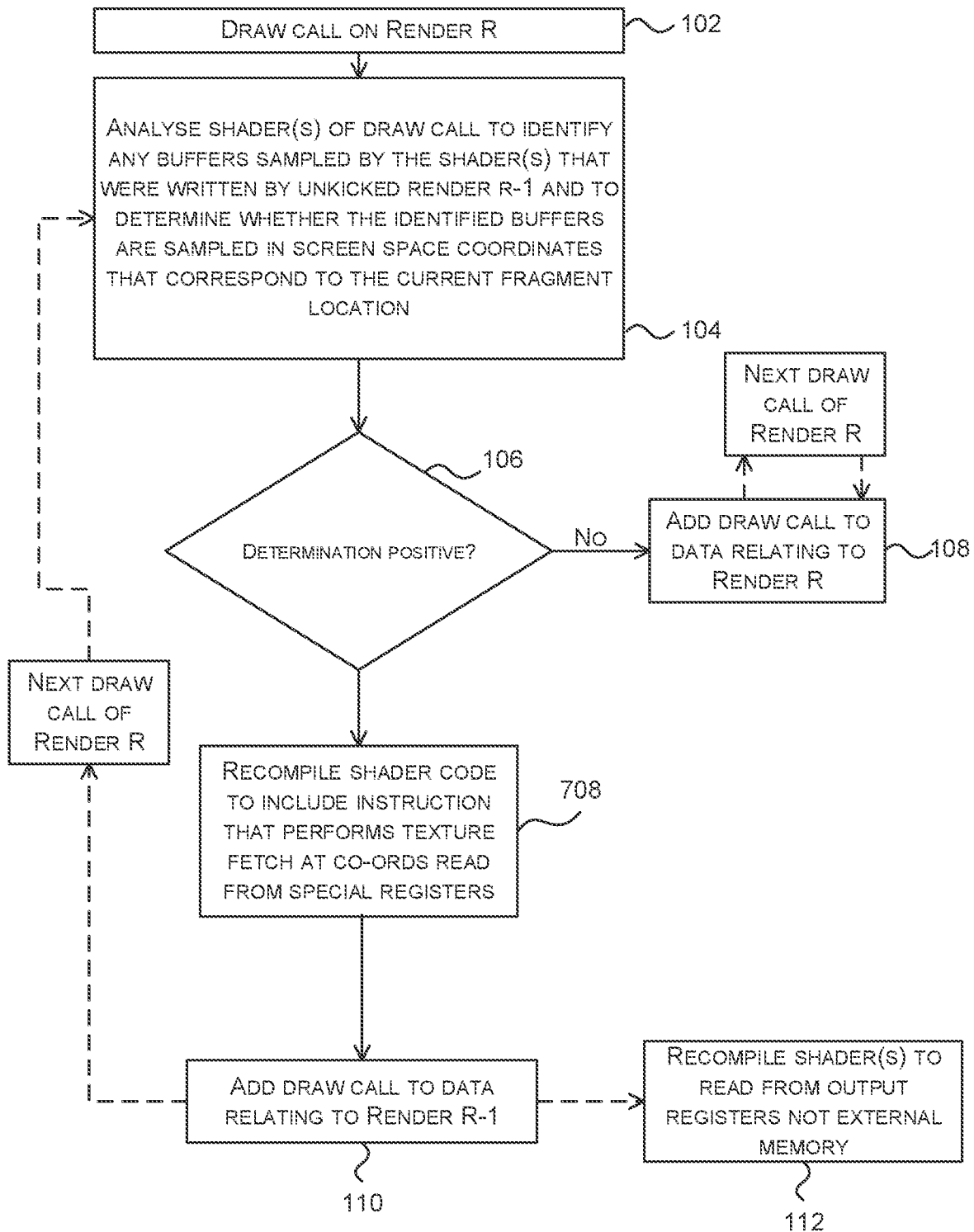
FIG. 8 is a flow diagram showing a sixth example method of rendering a scene which is a variant of that shown in FIGS. 1A and 7.

As shown in FIG. 7, in response to the first draw call on render R (block 102), one or more shaders used in the draw call are analysed (block 704) to enable a determination to be made (in block 706) as to whether the fragment shader samples buffers in screen space coordinates that correspond to the current fragment location. The analysis (in block 704) may only be of the fragment shader itself (i.e. of the fragment shader code) or the analysis may involve the corresponding vertex shader (i.e. the vertex shader that generates outputs that are input to the fragment shader). In some examples, data stored in external memory may also be analysed in combination with one or more shaders (e.g. in combination with both a fragment shader and the corresponding vertex shader). This analysis, which is a subset of that described above in relation to blocks 104-106 and may use any of the methods described above in relation to blocks 104 and 106, is described in more detail below.

If it is determined that the fragment shader samples buffers in screen space coordinates that correspond to the current fragment location('Yes' in block 706), then the fragment shader is recompiled to replace the corresponding shader code that samples the buffers at that position with a texture fetch using coordinates from a pair of special registers which always hold the current fragment location (block 708). Additionally any code that calculates the sample position may be removed as part of the compilation process (in block 708). As well as recompiling the fragment shader code in this way, the vertex shader code may also be recompiled so that it no longer outputs any variables that are only used by the fragment shader used, prior to the recompilation, to compute the sample position as this is no longer computed by the fragment shader. Additionally, any computations performed within the vertex shader to calculate these variables that are no longer required, may be removed from the vertex shader on recompilation and similarly, any computations in the fragment shader that are used only in the computation of the current fragment location may be removed.

In contrast, if it is determined that the fragment of render R does not sample buffers in screen space coordinates that correspond to the current fragment location ('No' in block 706), then this recompiling of the shader (in block 708) does not occur and the rendering operation continues unaffected.

The analysis of the shader(s) (in block 704) may operate in a similar manner to the analysis described in relation to the previous methods (e.g. in block 104). For example, the same or a similar set of predefined patterns may be used to check if the particular screen space coordinates used correspond to the current fragment location. For example, as detailed above, a fragment shader program may contain code such as:

$$\text{Coord}=(\text{texCoord} \times A)+B$$

$$\text{Col}=\text{texture}(t,\text{Coord})$$

Where texCoord is the variable received from the vertex shader and is known to be in clip space coordinates, A and B are constants, and the second statement samples the texture 't' at coordinate 'Coord' to determine the colour of a pixel. The values of constants A and B may, for example, be A=B=0.5, to map the typical clip space coordinate range of −1.0 to 1.0 into a screen space range of 0.0 to 1.0. When the view port is also full screen, the use of these coordinates to sample a texture indicates that the texture is being sampled in screen space at a location that corresponds to the current fragment location. Consequently the pair of instructions above (in the fragment shader) may be replaced by a single instruction:

$$\text{Col}=\text{texelFetch}(t,SRx,SRy)$$

where SRx and SRy are the addresses of the pair of special registers which always hold the coordinates of the current fragment location, and texelFetch is a function that samples a texture using non-normalised integral coordinates. Additionally, if the variable 'texCoord' is no longer used by the fragment shader, any instructions in the vertex shader (including any memory reads) that are used to calculate this variable can be omitted and the instruction that writes the value of the variable to the parameter memory can also be omitted.

In another example, if a predefined pattern comprising a texture fetch from a standard variable that corresponds to the current screen position is detected, this may be replaced (in block 708) by a texture fetch using coordinates from a pair of special registers which always hold the current fragment location. For example, if any instruction of the form:

Col=texture($t$,fragCoord/$R$)

Where R corresponds to the screen resolution, is detected, then the instruction may be replaced by:

Col=texelFetch($t$,$SRx$,$SRy$)

By recompiling the shader code, where the test is passed (in block 706), the number of instructions in the shader code is reduced, thereby improving the efficiency of the shader (e.g. reducing the computational effort required to execute it). Additionally, the recompilation may reduce both the amount of data that is written by the vertex shader to parameter memory 636 (e.g. by not writing the value of texCoord in the first example above) and the amount of data that is read from external memory by the fragment shader (e.g. by not reading the value of texCoord in the first example above), and hence overall memory bandwidth is reduced.

FIG. 8 shows a flow diagram of a combination of the methods of FIGS. 1A and 7. In this combined method, the analysis of the shader(s) (in block 104) is as described above with reference to FIG. 1A since this encompasses the analysis described above with reference to FIG. 7 (and block 704). Similarly, there is no need for the test in FIG. 7 (in block 706) as the test of FIG. 1A (block 106) includes a test for sampling at current fragment position. Whilst two separate recompilation operations (blocks 708 and 112) are shown in FIG. 8, it will be appreciated that these two operations may be combined, with additional data being stored (in a block that replaces block 708) in response to identifying a texture fetch at the current fragment location ('Yes' in block 706) and prior to (or in parallel with) adding the draw call to the data relating to the previous render (in block 110) in order that the subsequent recompilation of the shader(s) (in a block that replaces block 112) performs all the recompilation operations (i.e. those that would have been performed in both block 708 and block 112).

In a further variant on that shown in FIG. 8, if the first draw call in render R is found not to sample from the identified buffer(s) in screen space coordinates that correspond to the current fragment location ('No' in block 106), such that the draw call is added to the data relating to render R, for subsequent draw calls of that render, the screen-space coordinate optimisation of FIG. 7 may still be used.

Whilst FIG. 8 shows a combination of the methods of FIGS. 1A and 7, in yet further variants the method may instead combine the methods of FIGS. 1B and 7 or FIGS. 3 and 7, e.g. by the addition of an additional test (block 305). However, this additional test that identifies aspects that preclude merging of renders does not preclude the use of the screen-space coordinate optimisation of FIG. 7 and so in the event that this test is failed ('No' in block 305), the method of FIG. 7 may still be used. In a further variant, the method may combine the methods of FIGS. 4 and 7, e.g. by the addition of the additional tests relating to the merge parameter (block 402) and the additional operations to update the merge parameter state (block 406). Again, in the event that the merge parameter test are failed ('No' in block 402), the method of FIG. 7 may still be used. In a yet further variant, the method may combine the methods of FIGS. 3, 4 and 7 with either the method of FIG. 1A or the method of FIG. 1B.

Referring back to the graphical example of a series of renders in FIG. 5, in various examples, the method of FIG. 7 may be used for render R-1 and the method of any one or more of FIGS. 1A/1B, 3 and 4 in combination with the method of FIG. 7 may be used to merge renders R and R+1.

The method of FIG. 7 may be implemented in the graphics system 600 shown in FIG. 6. The method of FIG. 7 is mainly implemented by the driver 608 (e.g. blocks 704-706) with the exception of the recompilation operation (block 708) that is implemented by the compiler 610 that operates in communication with the driver 608. Whilst not shown in FIG. 6, the special registers are located within the pixel processing logic 618.

The graphics system 600 of FIG. 6 is shown as comprising a number of functional blocks. This is schematic only and is not intended to define a strict division between different logic elements of such entities. Each functional block may be provided in any suitable manner. It is to be understood that intermediate values described herein as being formed by a graphics system need not be physically generated by the graphics system at any point and may merely represent logical values which conveniently describe the processing performed by the graphics system between its input and output.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL C. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics system configured to perform any of the methods described herein, or to manufacture a graphics system comprising any apparatus described herein. An integrated circuit definition dataset may be, for example, an integrated circuit description.

Therefore, there may be provided a method of manufacturing, at an integrated circuit manufacturing system, a graphics system as described herein. Furthermore, there may be provided an integrated circuit definition dataset that, when processed in an integrated circuit manufacturing system, causes the method of manufacturing a graphics system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics system will now be described with respect to FIG. 9.

Figure 9:
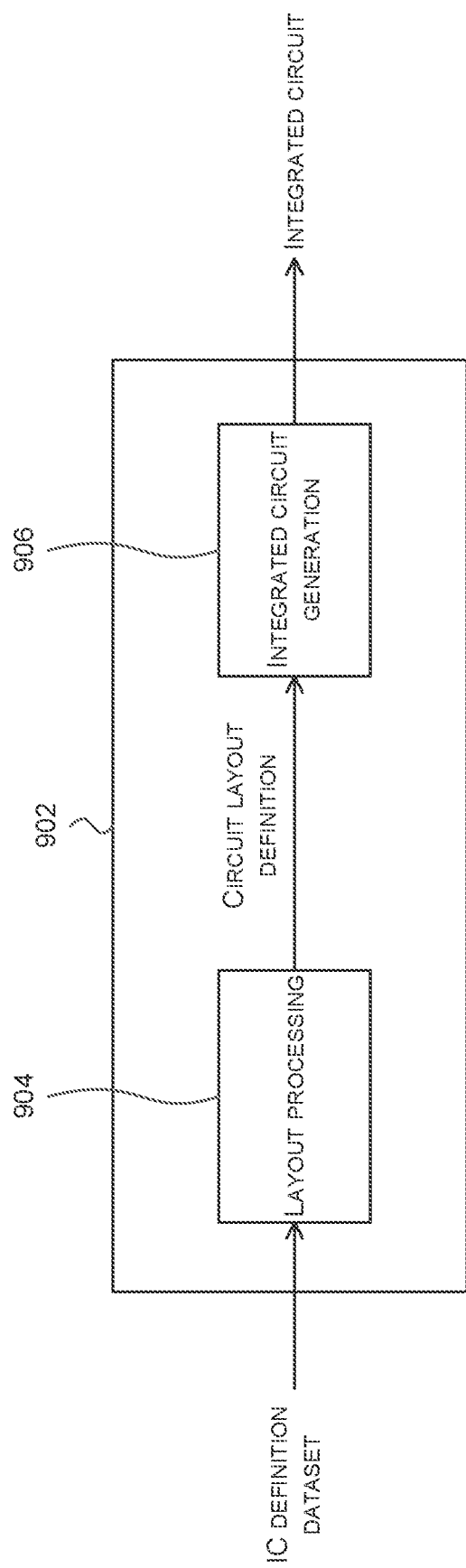
FIG. 9 shows an integrated circuit manufacturing system for generating an integrated circuit embodying a graphics processing system.

FIG. 9 shows an example of an integrated circuit (IC) manufacturing system 902 which is configured to manufacture a graphics system as described in any of the examples herein. In particular, the IC manufacturing system 902 comprises a layout processing system 904 and an integrated circuit generation system 906. The IC manufacturing system 902 is configured to receive an IC definition dataset (e.g. defining a graphics system as described in any of the examples herein), process the IC definition dataset, and generate an IC according to the IC definition dataset (e.g. which embodies a graphics system as described in any of the examples herein). The processing of the IC definition dataset configures the IC manufacturing system 902 to manufacture an integrated circuit embodying a graphics system as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering a scene in a graphics system, the method comprising:
    analysing a shader used by a draw call within a current render to determine whether the shader samples from a buffer at coordinates matching a current fragment location; and
    in response to determining that the shader used by the draw call does sample from the buffer at coordinates matching a current fragment location, recompiling the shader to replace an instruction that reads data from the buffer at coordinates matching a current fragment location with an instruction that reads from the buffer at coordinates stored in registers.

2. The method according to claim 1, wherein recompiling the shader further comprises:
removing any instructions that calculate the coordinates matching a current fragment location.

3. The method according to claim 2, further comprising recompiling one or more other shaders used by the draw call to omit any instructions that calculate or output parameters used only by instructions that have been removed in the recompilation of the shader.

4. The method according to claim 1, wherein analysing a shader used by the draw call within the current render to determine whether the shader samples from the buffer at coordinates matching a current fragment location comprises:
analysing a shader used by the draw call within the current render to determine whether the shader samples from the buffer using screen space coordinates that correspond to the current fragment location.

5. The method according to claim 1, wherein analysing a shader used by the draw call within the current render to determine whether the shader samples from the buffer at coordinates matching a current fragment location comprises:
inspecting code in the shader to determine whether one of a predefined set of patterns is present within the code.

6. The method according to claim 1, wherein analysing a shader used by the draw call within the current render to determine whether the shader samples from the buffer at coordinates matching a current fragment location comprises:
inspecting code in the shader to determine whether a sample position used to sample from the identified buffers is calculated in the shader using a screen-space transformation.

7. The method according to claim 1, wherein the draw call within the current render is an initial draw call in the current render.

8. A non-transitory computer readable storage medium having stored thereon computer readable code configured to cause the method of claim 1 to be performed when the code is executed.

9. A graphics system comprising a general purpose processor and a graphics processor, wherein the general purpose processor comprises a driver and a compiler, wherein the driver is configured to:
analyse a shader used by a draw call within a current render to determine whether the shader samples from a buffer at coordinates matching a current fragment location; and
in response to determining that the shader used by the draw call does sample from the buffer at coordinates matching a current fragment location, trigger recompilation of the shader by the compiler to replace an instruction that reads data from the buffer at coordinates matching a current fragment location with an instruction that reads from the buffer at coordinates stored in registers.

10. The graphics system according to claim 9, wherein the compiler is configured, in response to receiving a trigger signal from the driver, to:
recompile the shader to replace an instruction that reads data from the buffer at coordinates matching a current fragment location with an instruction that reads from the buffer at coordinates stored in registers.

11. The graphics system according to claim 10, wherein the compiler is further configured, in response to receiving a trigger signal from the driver, to:
recompile the shader to remove any instructions that calculate the coordinates matching a current fragment location.

12. The graphics system according to claim 11, wherein the compiler is further configured, in response to receiving a trigger signal from the driver, to:
recompile the shader to omit any instructions that calculate or output parameters used only by instructions that have been removed in the recompilation of the shader.

* * * * *